(12) United States Patent
Reinhardt et al.

(10) Patent No.: US 10,320,695 B2
(45) Date of Patent: Jun. 11, 2019

(54) MESSAGE AGGREGATION, COMBINING AND COMPRESSION FOR EFFICIENT DATA COMMUNICATIONS IN GPU-BASED CLUSTERS

(71) Applicant: Advanced Micro Devices, Inc., Sunnyvale, CA (US)

(72) Inventors: Steven K. Reinhardt, Vancouver, WA (US); Marc S. Orr, Newcastle, WA (US); Bradford M. Beckmann, Redmond, WA (US); Shuai Che, Bellevue, WA (US); David A. Wood, Madison, WI (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 283 days.

(21) Appl. No.: 15/165,953

(22) Filed: May 26, 2016

(65) Prior Publication Data
US 2016/0352598 A1    Dec. 1, 2016

Related U.S. Application Data

(60) Provisional application No. 62/168,519, filed on May 29, 2015.

(51) Int. Cl.
*G06F 15/173* (2006.01)
*H04L 12/805* (2013.01)
*H04L 12/811* (2013.01)

(52) U.S. Cl.
CPC ............ *H04L 47/365* (2013.01); *H04L 47/38* (2013.01)

(58) Field of Classification Search
CPC ............................. H04L 47/365; H04L 47/38
See application file for complete search history.

(56) References Cited

U.S. PATENT DOCUMENTS

| 7,221,678 | B1 | 5/2007 | Hughes | |
| 7,221,684 | B1 * | 5/2007 | Smith | H04L 69/04 370/393 |
| 8,797,864 | B2 * | 8/2014 | Gershinsky | H04L 47/12 370/230 |
| 2009/0300039 | A1 * | 12/2009 | Stengelin | H03M 7/30 |

(Continued)

OTHER PUBLICATIONS

Orr et al., "Fine-grain Task Aggregation and Coordination on GPUs", Proceedings of the 41st Annual International Symposium on Computer Architecture, Jun. 14, 2014, pp. 181-192, IEEE Press, Piscataway, NJ, USA, http://research.cs.wisc.edu/multifacet/papers/isca14-channels.pdf. [Retrieved Jun. 23, 2017].

(Continued)

*Primary Examiner* — Mohamed Wasel
(74) *Attorney, Agent, or Firm* — Meyertons Hood Kivlin Kowert and Goetzel PC; Rory D. Rankin

(57) ABSTRACT

A system and method for efficient management of network traffic management of highly data parallel computing. A processing node includes one or more processors capable of generating network messages. A network interface is used to receive and send network messages across a network. The processing node reduces at least one of a number or a storage size of the original network messages into one or more new network messages. The new network messages are sent to the network interface to send across the network.

17 Claims, 10 Drawing Sheets

(56) References Cited

U.S. PATENT DOCUMENTS

2012/0207079 A1\* 8/2012 Wang ................ H04W 28/0284
370/315
2016/0267170 A1\* 9/2016 Hastings ................. H04L 67/10

OTHER PUBLICATIONS

Malewicz et al., "Pregel: A System for Large-Scale Graph Processing", Proceedings of the 2010 ACM SIGMOD International Conference on Management of Data, Jun. 6, 2010, pp. 135-145, ACM, New York, NY, USA.

\* cited by examiner

MESSAGE AGGREGATION, COMBINING AND COMPRESSION FOR EFFICIENT DATA COMMUNICATIONS IN GPU-BASED CLUSTERS

PRIORITY INFORMATION

This application claims benefit of priority of U.S. Provisional Application Ser. No. 62/168,519 titled "MESSAGE AGGREGATION, COMBINING AND COMPRESSION FOR EFFICIENT DATA COMMUNICATIONS IN GPU-BASED CLUSTERS" filed May 29, 2015, which is hereby incorporated by reference in its entirety as though fully and completely set forth herein.

BACKGROUND

Technical Field

This invention relates to computing systems, and more particularly, to efficient network traffic management of highly data parallel computing.

Description of the Relevant Art

Generally speaking, when a general-purpose processor such as a central processing unit (CPU) is performing input/output (I/O) operations for an application, it is occupied for the duration of the operations. Additionally, in a system that includes multiple processors, the CPU may be the only processor with support for I/O abstractions such as network sockets. Therefore, the CPU may be partially or fully unavailable while performing both local and network I/O operations and coordinating communications between a network interface and other processors. Further, the other processors may incur delays while waiting for the CPU to coordinate network communications on their behalf.

In addition to general-purpose processors, computing systems may include other types of processors. One example of another type of processor is a parallel processor with a parallel architecture. Data parallel processors may include graphics processing units (GPUs), digital signal processors (DSPs), and so forth. In such systems, the parallel processor may not support I/O abstractions, such as network sockets, and may rely on a CPU for network communication. Consequently, the benefits of using the parallel processor may be reduced as delays are incurred as a result of having to rely on the CPU to support network communications. A further issue that may arise is that if the parallel processor includes support for direct network communication, each of the available work-items or threads being processed by the processor would be capable of generating an independent network message. In some cases the number of such work-items and/or threads may be relatively large. Consequently, transferring a relatively large number of small individual messages between processing nodes across a network may incur undesirable overhead.

In view of the above, methods and systems for efficient management of network traffic management are desired.

SUMMARY OF EMBODIMENTS

Systems and methods for efficient management of network traffic management are contemplated.

In various embodiments, a processing node includes a heterogeneous multi-core architecture. The processing node includes one or more processors, each capable of generating network messages. A network interface is used to receive and send network messages across the network. Prior to the processing node sending the original network messages generated by the one or more processors, the control logic within the processing node reads the original network messages and generates new network messages. The new network messages may include a smaller number of messages than the original network messages. The new messages may also include less data to send than the original network messages. However, the original content of the original network messages may still be generated from the new network messages.

In order to generate the new network messages, the control logic within the processing node may identify multiple network messages that have the same data and same destination. These multiple messages may be combined into a single compressed network message with the data being stored only once in the single message, rather than multiple times across multiple network messages. Additionally, the control logic may identify network messages storing data with commutative and/or associative properties. In various embodiments, the control logic may place smaller sized data in the new network messages. The smaller sized data may be a result of using particular operations to combine the original data elements. Indications of the properties used to combine the data elements may be stored with the result in the new network messages. The processing node then sends the new network messages to the network interface for conveyance across the network.

These and other embodiments will be further appreciated upon reference to the following description and drawings.

Figure 1:
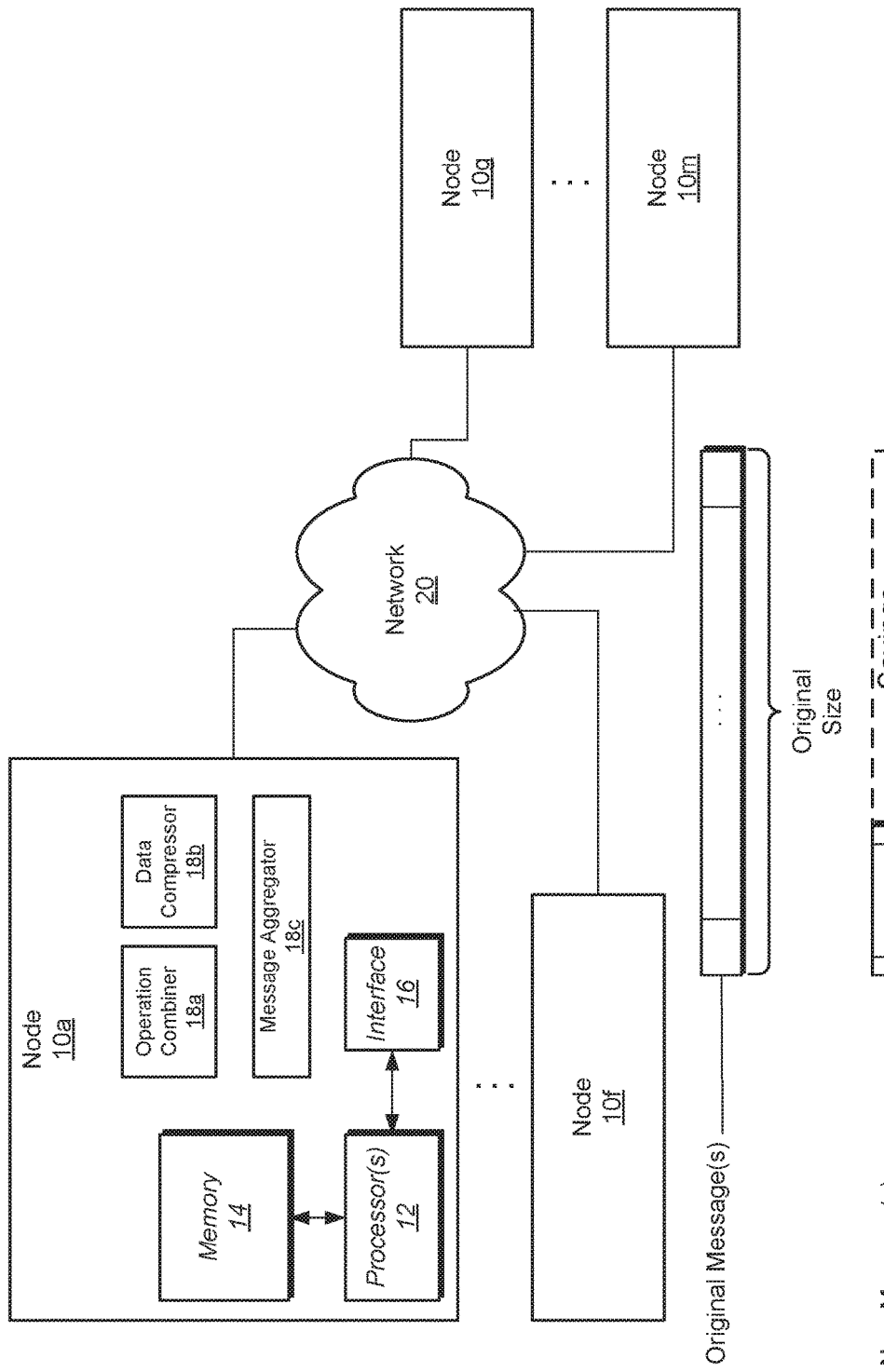
FIG. 1 is a generalized diagram of one embodiment of a computing system transferring packed network messages.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a computing system is shown. The computing system includes nodes 10a-10m which may use the network 20 and interconnect links (not shown) for communication with one another. Various embodiments may comprise any number of nodes in the computing system. For example, each of the nodes 10a-10m may be a computing device such as a desktop computer, a server, a laptop, a tablet computer, a smartphone, and so forth. Each of the nodes 10a-10m may include processing elements connected a memory. In some embodiments, each of the nodes 10a-10m may both send and receive network messages across the network 20. In other embodiments, one or more of the nodes 10a-10m may be configured as a requester node generating network messages and receiving response data or acknowledgments from another node. In addition, one or more of the nodes 10a-10m may be configured as a target node, or endpoint node, for receiving network messages from other nodes, processing the network messages and sending response data or acknowledgments to the other nodes. Generally speaking, nodes may be operable as both a requestor node and a receiving node.

The network messages sent across the network 20 and the interconnect links may include requests for statistics or other information, response data with requested statistics or other information, a mathematical operation or function with an accompanying full set of data or a subset of data used as operands for the operation or function, read operations for targeted data, write operations for targeted data, requests to migrate threads and/or data, and so forth. The traffic of the network messages on the interconnect links between the nodes 10a-10m may increase to an amount such that it reaches a bandwidth threshold and appreciably increases communication latency. In various embodiments, the amount of network traffic may be measured based on a size and/or number of network messages during a given period of time. As will be described herein, the size and/or number of network messages may be reduced with processing prior to sending the network messages across the network 20 and the interconnect links. Such processing may include at least combining various operations identified within the network messages, compressing data in the network messages, and/or aggregating the network messages.

In various embodiments, the nodes 10a-10m are connected to one another via interconnect links through the network 20. The nodes 10a-10m and the links may use a network interconnect protocol. For example, the network 20, interconnect links and a network interface in the nodes 10a-10m may include standard network protocol connections such as the Internet, Ethernet, Fibre Channel, a Wi-Fi connection and so forth.

As shown, the node 10a includes a processor 12, a memory 14 connected to the processor 12 and an interface 16 also connected to the processor 12. Each of the other nodes in the computing system may include similar components. The processor 12 may be one of several known types of processors. For example, the processor 12 may include a general-purpose CPU (central processing unit), a SIMD (single instruction multiple data) processor such as a GPU (graphics processing unit), a heterogeneous processing unit, and so forth. The processor 12 may utilize one or more processing cores for processing both control software, such as an operating system (OS) and firmware, and software applications that include instructions from one of several types of instruction set architectures (ISAs).

The memory 14 may include any suitable memory device. Examples of the memory devices include RAMBUS dynamic random access memories (DRAMs), synchronous DRAMs (SDRAMs), DRAM, static RAM, three-dimensional (3D) integrated DRAM, etc.

The address space of the computing system may be divided among the nodes 10a-10m. Each one of the nodes 10a-10m may include a memory map used to determine which addresses are mapped to which system memory, and hence to which one of the nodes 10a-10m a memory request for a particular address should be routed. In some embodiments, a cache coherency point for an address within the computing system is the memory controller (not shown) to the memory storing bytes corresponding to the address.

The interface 16 in the node 10a may include control logic and buffers or queues used to communicate with other nodes via the network 20 and the interconnect links. The interface 16 may use a particular interconnect protocol based on the type of system that is the computing system. As described earlier, the network communication may include use of the Internet, an Ethernet connection, Fibre Channel and so forth, based on the type of the computing system.

As described earlier, the amount of network messages may be measured as the size and/or the number of the network messages. One or more of the nodes 10a-10m may generate a significant number of network messages during processing of software applications. For example, the processor 12 in a given node of the nodes 10a-10m may include a data parallel processor with a significantly high number of parallel data processing elements or lanes. Each of these parallel data processing lanes may generate a network message during processing of software applications, thus appreciably increasing a total number of network messages on the interconnect links between the nodes 10a-10m. The processor 12 may be used to process software applications utilizing highly parallel data processing. Examples of these applications include graphics processing, audio processing, medical applications, fluid dynamics applications and other applications used in finance, engineering and so forth.

The above applications may have threads distributed across the nodes 10a-10m through the network 20 and use a distributed shared memory system. Each of the parallel data processing lanes in processor 12 may generate a network message during processing of the software applications, thus appreciably increasing a total number of network messages on the interconnect links between the nodes 10a-10m.

The amount of network messages generated by any one of the nodes 10a-10m may be reduced by further processing of the network messages prior to sending the network messages across the interconnect links. For example, after one or more processors 12 in a given node of the nodes 10a-10m generates network messages, these network messages may be inspected to determine whether they qualify for further processing that reduces the amount of the network messages.

The further processing on the generated network messages may include at least combining operations in the generated network messages, compressing data in the generated network messages and/or aggregating the generated network messages. In various embodiments, the further processing is performed by an integrated controller, an integrated processor, or a unit with control and function logic within one or more of the nodes 10a-10m. As shown in the illustrated embodiment, at least node 10a includes an operation combiner 18a, a data compressor 18b, and a message aggregator 18c, which are capable of performing the further processing on the generated network messages.

In various embodiments, the operation combiner 18a may be used for combining operations represented by data within one or more network messages from a same thread based on associative, commutative and other properties. These operations may be referred to as combinable or combining operations. For each type of combining operation, any combination of operands using a given type of combinable operation will provide a same result. Examples of combinable operations include commutative operations, associative operations, a maximum function, a minimum function, and so forth. In some cases the result may be considered a partial result as the operands may be intended to be combined at a destination node with other operands in one or more other network messages from one or more other nodes.

Combining data found within one or more network messages generated by a same thread may occur after detecting an indication in the one or more network messages that indicates multiple data operands are used for a given combinable operation. Such data operands may be combined according to the given operation and provide a same result independent of the order of the combining of the data operands. For example, the operation may be a "maximum" function which selects an element with a maximum value from a group of elements. Any combination of the data operands being operated on by the maximum operation provides a same result. Other examples of the given operation include a commutative operation, an associative operation, and a minimum function.

In various embodiments, the result, rather than the multiple data operands, may be sent from the node 10a to the destination. This result may be combined with one or more other partial results according to the given operation on a destination node of the nodes 10a-10m. In other embodiments, the operation combiner 18a may perform the combinable operations identified in a network message and then repeat the combinable operation when determining multiple network messages have a same originating thread, a same destination node and/or a same combinable operation. For example, a first network message generated by a first thread may include a first set of operands and an operator indicating a maximum function is to be performed. In addition, a second network message including a second set of operands may also indicate a maximum function is to be performed. Each of the first network message and the second network message may further identify a same destination node. In various embodiments, having identified both messages, the operation combiner 18a may perform the maximum function separately on each of the first set of operands and the second set of operands followed by performing the maximum function on the respective results. Alternatively, the operation combiner 18a may perform the maximum function concurrently on the first set of operands and the second set of operands. The singular result may then be conveyed to the destination, rather than two separate results.

In various embodiments, the data compressor 18b is used for reducing multiple redundant copies of a data element to a single instance which is then conveyed via the network. For example, the processor 12 may generate multiple identical network messages to be sent to multiple destination threads on one or more other nodes of the nodes 10a-10m. The data compressor 18b may determine the messages are identical or otherwise represent a redundancy in their messages. Responsive to determining the redundancy exists, the data compressor 18b reduces the multiple identical network messages to a single network message. After identifying multiple network messages with different user data that have a same destination node of the nodes 10a-10m, the message aggregator 18c may place the different user data of each of the identified multiple network messages in a single network message with the same destination as the original messages. The message aggregator 18c may further create a packet header for the single network message. In some embodiments a single network message may include multiple encoded identifiers identifying the multiple destination threads.

In some embodiments, the operation combiner 18a, the data compressor 18b and the message aggregator 18c are components that are separate from the processor 12 and interface 16. In other embodiments, each of the operation combiner 18a, the data compressor 18b, and the message aggregator 18c has control logic that utilizes functionality in the processor 12 for processing the network messages. In various embodiments, each of the operation combiner 18a, the data compressor 18b, and the message aggregator 18c is implemented in hardware. However, other embodiments may use a software implementation or a combination of hardware and software. Regardless of the implementation, processing of the network messages by each of the operation combiner 18a, the data compressor 18b and the message aggregator 18c may be transparent to software applications being executed by the processor 12.

Figure 2:
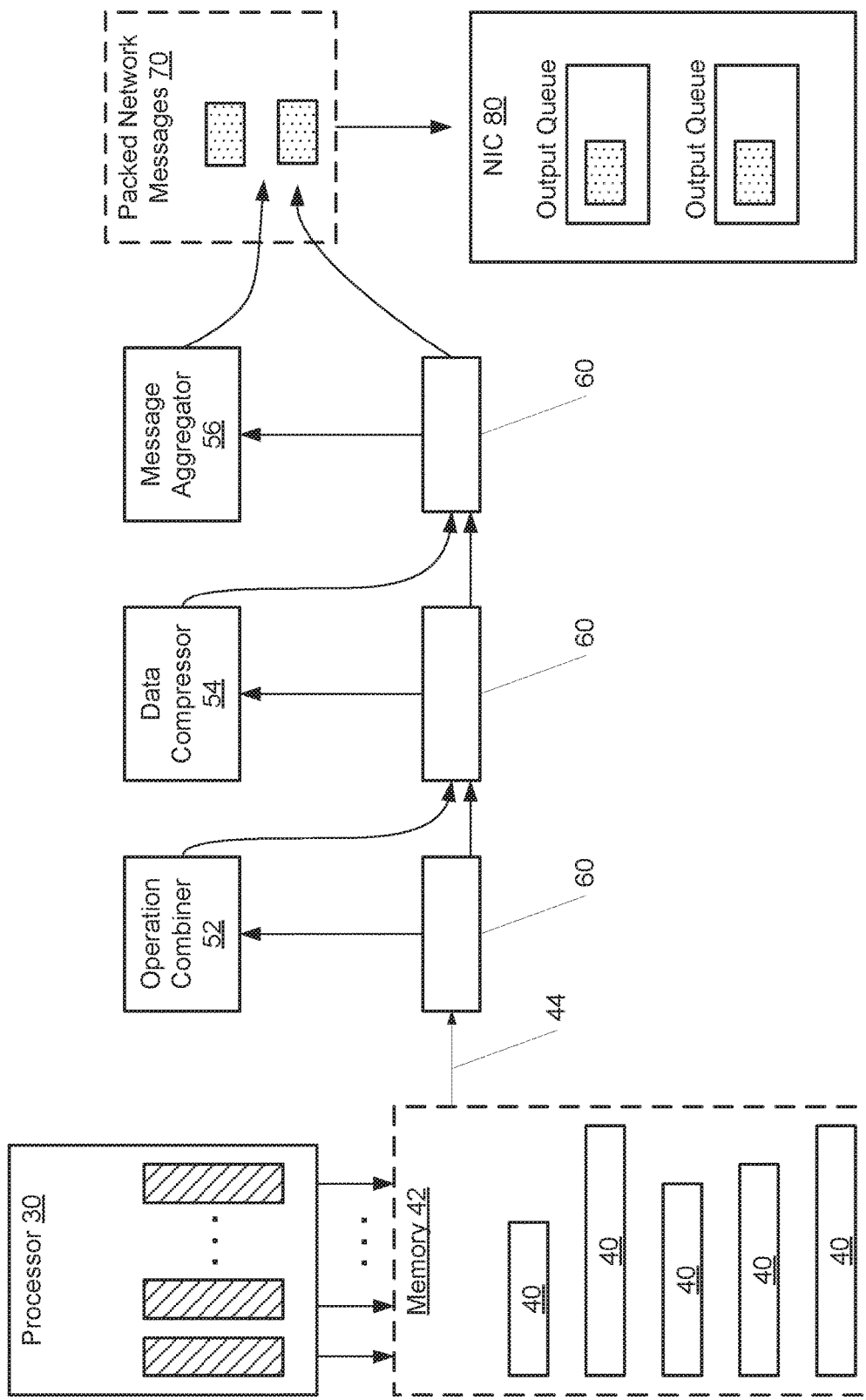
FIG. 2 is a generalized diagram of one embodiment of an exemplary processing node packing network messages.

Turning now to FIG. 2, a generalized block diagram of one embodiment of an exemplary processing node configured to reduce network messages is shown. In the embodiment shown, the node includes a processor 30, operation combiner 52, data compressor 54, message aggregator 56, a set of queues 60, and a network interface card (NIC) 80. In various embodiments, the processor 30 may include multiple parallel data processing elements. The parallel data processing elements may be referred to as lanes. For example, each lane may be a SIMD (single instruction multiple data) lane in a SIMD processor.

In the example shown, the processor 30 generates multiple network messages 40. Each of the multiple network messages 40 may include a packet header indicating a destination (e.g., a destination thread and/or a destination node). Each of the multiple network messages 40 may also include one or more data elements corresponding to data generated by the processor 30 for a given thread. The generated network messages 40 are shown as varying in size. Though in other embodiments messages may have a fixed size.

In various embodiments, the network messages 40 are stored in a memory 42 connected to the processor 30. The memory 42 may represent one or more types of data storage. For example, the processor 30 may be able to access data stored in one or more of data storage buffers, a local cache memory and designated queues within a system memory. As shown, the network messages may be conveyed 44 via a path to queues 60 where they are stored during processing. In some embodiments, the network messages are stored in particular queues based on the type of processing to be performed (or processing that has been performed) on the network messages. In various embodiments, each of the operation combiner 52, the data compressor 54 and the message aggregator 56 may monitor the separate queues 60 and determine whether and when to process the network messages. In some embodiments, each of the components 52-56 does not begin processing network messages stored in a particular queue until determining conditions associated with the particular queue are satisfied. Such conditions may include determining the amount of data in a queue has reached a given threshold, a particular network message in a queue has reached a certain age (e.g., has been in the queue for a given period of time), or otherwise.

In some embodiments, the queues 60 are entries in a DRAM. In other embodiments, the queues 60 are built from random access memory (RAM) cells organized as a content addressable memory. Other embodiments for the queues 60 used for storage of the network messages 40 are possible and contemplated. In various embodiments, the set of queues 60 are used by the combiner 52, compressor 54, and aggregator 54 in a pipelined manner.

In some embodiments, each of the components 52-56 includes respective monitoring logic which detects when conditions are satisfied for beginning to process the stored network messages. In other embodiments, monitoring logic is located external to the components 52-56 and communicates with the components 52-56. In some embodiments, the components 52-56 may begin processing network messages after detecting the generated network messages 40 have been produced by the processor 30.

In some embodiments, the processor 30 sends notification to the one or more of the components 52-56 indicating the network messages 40 have been produced. In other embodiments, one or more of the components 52-56 verifies (e.g., each clock cycle or on some other basis) whether valid network messages 40 have been generated. In some embodiments, the processor 30 inserts a flag or other indication in network messages that are qualified for processing. The flag or indication may also indicate the type of processing to perform on a given network message, such as operation combining, data compressing, message aggregating, or otherwise.

In some embodiments, one or more of the components 52-56 may detect the presence of the generated network messages 40. For example, the network messages 40 may be detected when stored in one or more of the queues 60. In response to detecting their presence in the queues, one or more of the components 52-56 may begin processing the stored network messages. Alternatively, one or more of the components 52-56 may detect when the network messages 40 are stored and begin monitoring the stored network messages 40 to determine whether one or more conditions are satisfied before processing the stored network messages 40.

In some embodiments, various conditions that may qualify processing of a message may include a size of the stored network messages in a queue 60 exceeds a threshold. Another condition may include detecting a particular duration of times has elapsed since a network message 40 has been generated, received, or stored in a queue 60. Another condition may include a number of stored network messages with a given priority level exceeds a respective threshold. Yet another condition may include a number of stored network messages targeted to a given destination node or destination thread exceeds a respective threshold. Other conditions for qualifying the start of processing the stored network messages are possible and contemplated.

In various embodiments, when a given condition is satisfied, the operation combiner 52 may inspect a network message(s) to determine whether the message(s) includes a combinable operation. In some embodiments, a flag may be set in the message to indicate the message includes a combinable operation. In other embodiments, the operation combiner 52 itself may determine whether or not an operation in a message is a combinable operation. Examples of a combinable operation include commutative operations, associative operations, a maximum function, a minimum function, and so forth.

Having identified a combinable operation, the operation combiner 52 may perform the given type of combinable operation on data operands in the message(s) and generate a packed network message with a result of the combined operation. In some embodiments, the resulting network messages may have a partial list of operands that is originally intended to be combined at a destination node with partial lists of operands from one or more other nodes. In some embodiments, the operation combiner 52 performs the given type of combinable operation for multiple network messages determined to have an operator indicating the given type of combinable operation. Performing the combined operation may include repeating a given type of operation on multiple results sequentially. In other embodiments, the operation combiner 52 performs the given type of operation concurrently on operands from multiple network messages.

In various embodiments, the combinable operations may be performed in an arbitrary order. Additionally, one or more of the combinable operations may be performed at the source node, while one or more of the combinable operations may be performed later at a destination node. If they are not further modified by subsequent processing, the network messages created by the operation combiner 52 may eventually become part of a final packed network message(s) 70. The packed network messages 70 are shown as shaded blocks of varying sizes, which may be smaller in number and/or smaller in size than the originally generated network messages 40. The packed network messages 70 may be sent from the queues 60 to output queues in a network interface controller (NIC) 80. Each of the packed network messages 70 may include packet headers with suitable information for unpacking the packed network messages 70 at their respective destinations.

Similar to the operation combiner 52, the data compressor 54 may also be capable of inspecting one or more network messages as described earlier. In various embodiments, the data compressor 54 determines whether separate network messages have a same destination node. In addition, the data compressor 54 may determine whether these separate network messages include the same data—in part or in whole. For example, an application being processed by the processor 30 may include a single thread that generates multiple identical messages to multiple destination threads on a single destination node. For network messages determined to have a same destination node and duplicated data, the data compressor 54 may combine them into a smaller number of packed network messages or even a single packed network message. The packed network messages have a single copy of the duplicated data. The data compressor 54 may determine encodings for the destination threads on the same destination node and insert these encodings into the packed network message(s). If they are not further packed by subsequent processing, the packed network messages created by the data compressor 54 may eventually become part of the packed network messages 70.

Similar to the operation combiner 52, the message aggregator 56 may also be capable of inspecting one or more network messages as described earlier. In various embodiments, the message aggregator 56 determines whether separate network messages have a same destination node. In addition, the message aggregator 56 may determine whether these separate network messages also have different data. These multiple network messages with different data that are targeted to a given destination node may be aggregated into a smaller number of packed network messages or even a single packed network message. In this manner, the number of messages to be conveyed is reduced.

In various embodiments, the message aggregator 56 may access the multiple network messages and collect different data from them. The collected data may be temporarily stored in a buffer prior to being inserted in one or more packed network messages. The message aggregator 56 may also determine metadata to keep track of which data corresponds to which destination thread in the same destination node. This metadata may be used to generate a packet header for the packed network messages. As before, if the resulting messages are not further packed by subsequent processing, the resulting messages created by the message aggregator 56 may eventually become part of the packed network messages 70. It is noted that the order of processing by the components 52-56 may occur in a different order than described above and some steps performed by the components 52-56 may be performed concurrently.

In various embodiments the output queues in the NIC 80 may be organized by destination, though other organization types are possible and are contemplated. In some embodiments, the packed network messages 70 are sent directly to the output queues in the NIC 80 upon being processed by one or more of the components 52-56. In other embodiments, the packed network messages 70 are stored in queues 60 before being sent to output queues in the NIC 80 as described earlier.

In some embodiments, conditions may need to be satisfied before the packed network messages 70 are sent to any output queues in the NIC 80. Such conditions may include exceeding a threshold for a number of packed network messages 70, exceeding a threshold for a number of a given type of packed network messages 70, exceeding a threshold for a total size of the packed network messages 70, a size of a given type of the packed network messages 70 exceeds a threshold, and/or a given period of time has elapsed since the packed network messages 70 were processed by one or more of the components 52-56. Priority levels, destinations, and other factors may also be used for the determining when to send the packed network messages 70 to the output queues in the NIC 80.

Figure 3:
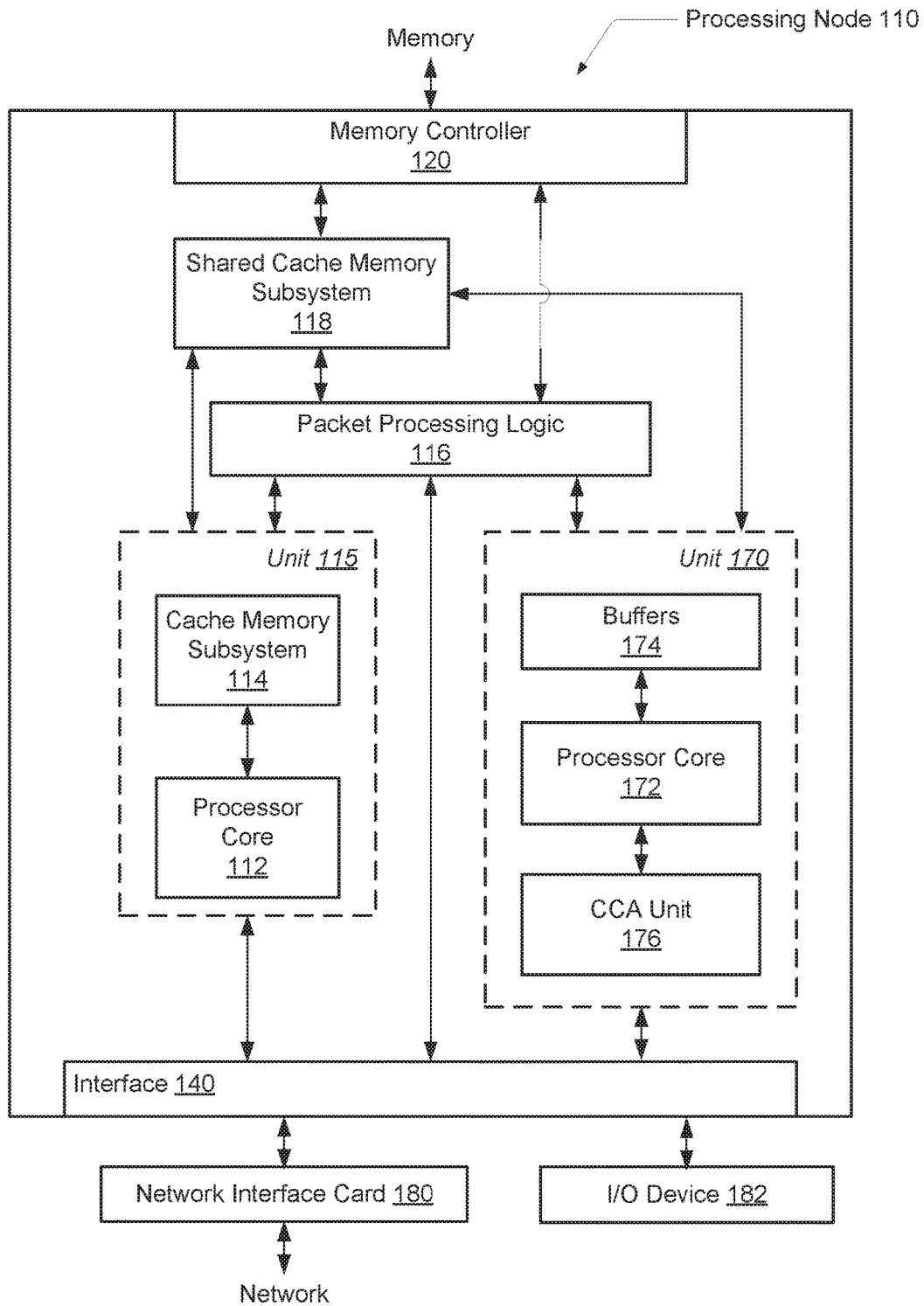
FIG. 3 is a generalized diagram of one embodiment of an exemplary processing node with a heterogeneous multi-core architecture capable of processing packed network messages.

Referring to FIG. 3, one embodiment of an exemplary processing node 110 with a heterogeneous multi-core architecture is shown. In some embodiments, the illustrated functionality of processing node 110 is incorporated in a single integrated circuit. Processing node 110 may include one or more processing units 115, which may include one or more processor cores 112 and an associated cache memory subsystem 114. In various embodiments, processor core 112 utilizes a general-purpose micro-architecture.

In one embodiment, processor cores 112 include circuitry for executing instructions according to a predefined general-purpose instruction set. For example, the x86, x86-64®, Alpha®, PowerPC®, MIPS®, PA-RISC®, or any other instruction set architecture may be selected. Generally speaking, processor core 112 accesses the cache memory subsystems 114 for data and instructions. If a requested block is not found in cache memory subsystem 114 or in shared cache memory subsystem 118, then a read request may be generated and transmitted to the memory controller 120 within the node to which the missing block is mapped. Cache memory subsystems 114 may be integrated within respective processor cores 112. Both the cache memory subsystem 114 and the shared cache memory subsystem 118 may include a cache memory coupled to a corresponding cache controller.

Processing node 110 may also include one or more processing units 170, which may comprise one or more data parallel processor cores 172 and data storage buffers 174. Processor core 172 may not be a mirrored silicon image of processor core 112. Processor core 172 may have a micro-architecture different from the micro-architecture used by processor core 112. In one embodiment, the processor core 172 may be a different generation of a same processor family as processor core 112. In another embodiment, the processor core 172 may be a voltage and/or frequency scaled version of processor core 112. In other words, the processor core 172 is not a silicon copy of the processor core 112 with a same functionality and instruction set architecture (ISA), a same clock frequency, same cache sizes, a same memory model, and so forth.

In yet another embodiment, the processor core 172 may comprise a micro-architecture that provides high instruction throughput for a computational intensive task. Processor core 172 may have a parallel architecture. For example, the processor core 172 may be a single instruction multiple data (SIMD) core. Examples of SIMD cores include graphics processing units (GPUs), digital signal processing (DSP) cores, or otherwise. In one embodiment, the processing node 110 comprises a single instruction set architecture (ISA).

High instruction throughput on processing node 110 may be achieved with measured power consumption within a given power limit when threads of software applications are efficiently scheduled. The threads may be scheduled on one of processor cores 112 and 172 in a manner that each thread has the highest instruction throughput based at least in part on the runtime hardware resources of the processor cores 112 and 172.

In one embodiment, processing unit 170 is a graphics processing unit (GPU). Modern GPUs are efficient for data parallel computing found within loops of applications, such as in applications for manipulating and displaying computer graphics, molecular dynamics simulations, finance computations, and so forth. The highly parallel structure of GPUs makes them more effective than general-purpose central processing units (CPUs), such as processing unit 115, for a range of complex algorithms. Conventional GPUs utilize wide single instruction multiple data (SIMD) architectures to achieve high throughput in highly data parallel applications. Each object is processed independently of other objects, but the same sequence of operations is used.

In one embodiment, the unit 170 may be integrated on the motherboard. In another embodiment, the illustrated functionality of processing node 110 may be incorporated upon a single integrated circuit. In such an embodiment, each of the unit 115, which may be a CPU, and the unit 170, which may be a GPU, may be proprietary cores from different design centers. Also, the GPU 170 may be able to directly access both local memories 114 and 118 and main memory via memory controller 120 from the processing node 110, rather than perform memory accesses off-chip via interface 140. This embodiment may lower latency for memory accesses for the GPU 170, which may translate into higher performance.

Generally, packet processing logic 116 is configured to respond to control packets received on the links to which processing node 110 is coupled, to generate control packets in response to processor cores 112 and 172 and/or cache memory subsystems 114, to generate probe commands and response packets in response to transactions selected by memory controller 120 for service, and to route packets for which node 110 is an intermediate node to other nodes through interface logic 140. In some embodiments, the packet processing logic 116 may be referred to as a crossbar switch.

Interface logic 140 may include logic to receive packets and synchronize some of the packets to an internal clock used by packet processing logic 116. Interface logic 140 may also include logic to communicate with one or more input/output (I/O) devices, such as computer peripheral devices, external memory storage devices, and so forth. In some embodiments, the interface logic 140 directly communicates with external devices without utilizing the packet processing logic 116, a crossbar switch or another component. For example, network messages may be conveyed directly between each of the unit 115 and the network interface card 180 and similarly between each of the unit 170 and the network interface card 180. I/O Device 182 may one of multiple examples of devices connected to the processing node 110. Although a single device is shown, in various embodiments, multiple devices may be connected to the processing node 110. The interface logic 140 may include at least a Universal Serial Bus (USB) interface, a Serial ATA bus interface to storage devices, a PCI Express Peripheral Component Interconnect Express (PCIe) serial expansion bus interface, a low pin count (LPC) bus, a peer-to-peer (P2P) direct memory access (DMA) controller, and so forth.

The processing node 110 may be connected to a network interface card (NIC) 180. The NIC 180 may include circuitry and logic for communicating with other processing nodes across a network. For example, the NIC 180 may utilize logic to communicate with a physical layer and a data link layer standard such as Ethernet, Fibre Channel, Wi-Fi or Token Ring. The NIC 180 may allow for communication with a group of close by computers on a same local area network (LAN). Additionally, the NIC 180 may allow for communication with other nodes across a network. The NIC 180 may include a network protocol stack such as a HTTP protocol for an application layer, a TCP protocol for a transport layer, an IP protocol for an internet layer, an Ethernet protocol for a data link layer, and an IEEE 802.3u protocol for a physical layer.

As shown, the unit 170 also includes a combiner/compressor/aggregator (CCA) unit 176. In various embodiments, the circuitry and/or logic in one or more of the components 52-56 described earlier in FIG. 2 is included in the CCA unit 176. In some embodiments, the circuitry and logic for performing the above discussed operation combining, data compressing and message aggregation is distributed across one or more of the unit 170, the interface 140 and the NIC 180. In other embodiments, the functionality of the CCA unit 176 is located entirely in one of unit 170, the interface 140 and the NIC 180. In yet other embodiments, the functionality of the CCA unit 176 is located in another unit not shown within the processing node 110. As previously discussed, the functionality of the CCA unit 176 (operation combining, data compressing, and/or message aggregation) may reduce bandwidth consumption and the burden of coordinating network communication for the unit 170 for a general-purpose CPU, such as the processor cores 112 within the unit 115. In some embodiments, the CCA unit 176 may provide direct communication between the unit 170 and the NIC 180.

In some embodiments, the CCA unit 176 includes support for peer-to-peer DMA communication between the data parallel processor 172 and the NIC 180. The logic 176 may include support for network socket application programming interfaces (APIs) to control and use network sockets, generate and decode network addresses, and process network socket protocols.

Figure 4:
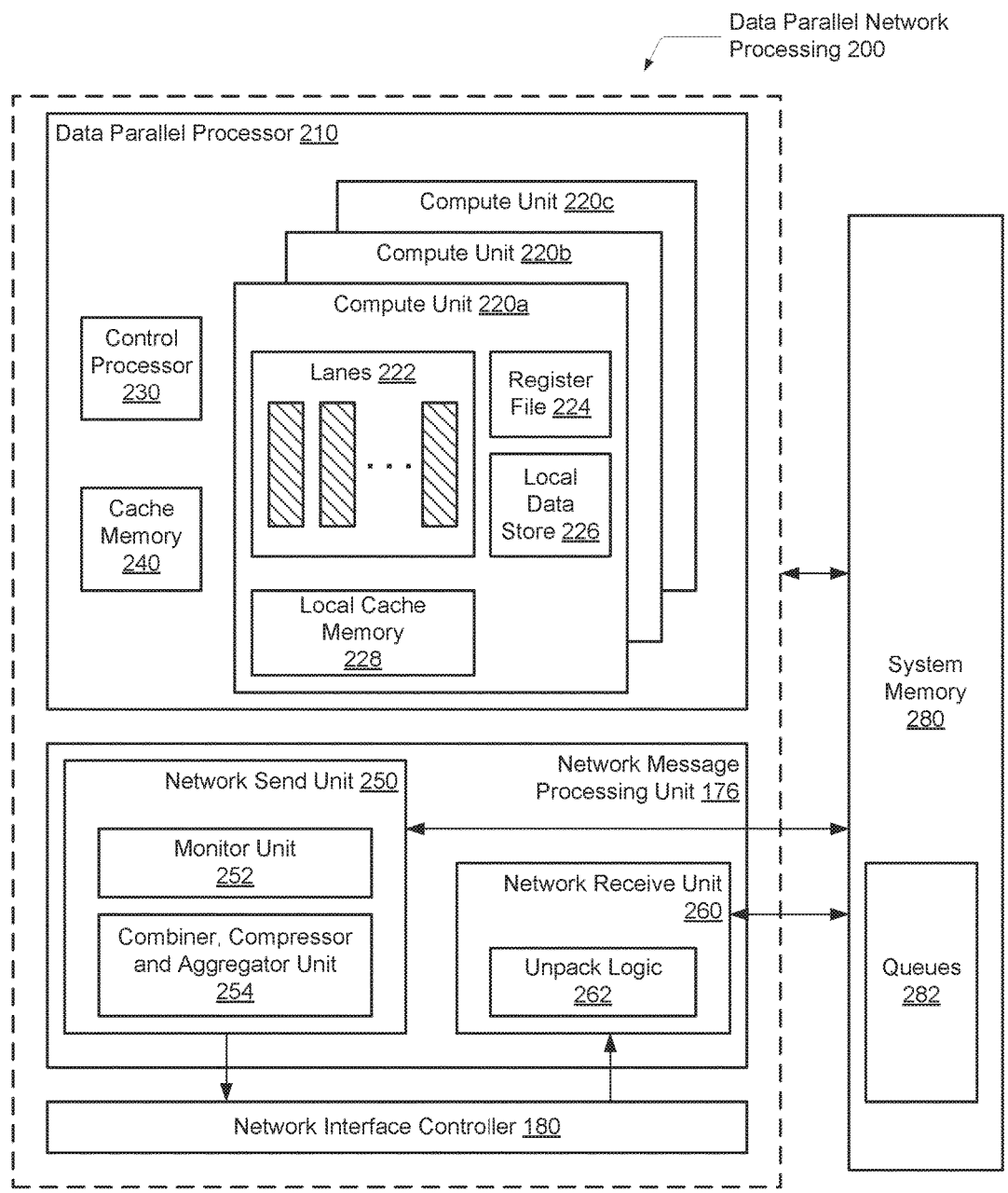
FIG. 4 is a generalized block diagram of one embodiment of network message processing within a data parallel architecture.

Turning now to FIG. 4, one embodiment illustrating network processing 200 within a data parallel architecture is shown. Circuitry and logic previously described are numbered identically. The data parallel processor 210 generates and sends network messages to a system memory 280 where the messages are stored in queues 282. In some embodiments, the processor 210 sends a notification to the network send unit 250 that messages for sending (conveyance via a network) have been generated. In other embodiments, a monitor unit 252 within the network send unit 250 monitors the queues 282, detects generated messages, and determines when to begin processing the stored messages.

A network receive unit 260 receives network messages from the network interface controller (NIC) 180. The unpack logic 262 within the network receive unit 260 may preprocess received messages before storing them in the memory 280 (e.g., in a queue 282). This pre-processing may also be referred to as decoding the received messages. In some embodiments, the network receive unit 260 sends a notification of the received messages to the network send unit 250. In other embodiments, the monitor unit 252 within the network send unit 250 monitors the queues and determines when to begin processing the received messages. In various embodiments, each of the network send unit 250 and the network receive unit 260 directly accesses the system memory 180 through read and write operations.

In the embodiment shown, combiner, compressor, and aggregator unit 254 is shown in the network send unit 250. This unit comprises circuitry and/or logic for performing the operations described earlier in relation to the components 52-56 in FIG. 2 (i.e., the operation combiner 52, data compressor 54, and message aggregator 56). It is noted that while this functionality is shown within the network send unit 250, it may be located elsewhere and may be distributed such that each of the operation combiner, data compressor, and message aggregation functions are performed by separate units. In the embodiment show, the processor 210, unit 250, and NIC 180 may send network messages out to the network in a pipelined manner. The system memory 280 may include one or more queues 282 for respective processing nodes across the network. As an example, a node with an identifier of "3" may have a respective queue within the system memory for storing network messages targeted to node 3. Similarly, a node with an identifier of "27" may have a respective queue within the system memory for storing network messages targeted to node 27.

Although an example of a single instruction multiple data (SIMD) micro-architecture is shown for the data parallel processor 210, other types of highly data parallel micro-architectures are possible and contemplated. Each of the compute units 220a-220c includes multiple lanes 222. Each lane may also be referred to as a SIMD unit or a SIMD lane. The lanes 222 may operate in lockstep. As shown, each of the compute units 220a-220c also includes a respective register file 224, a local data store 226 and a local cache memory 228. A control processor 230 is also shown within processor 210.

As described in relation to FIG. 2, the operation combiner 254 may analyze network messages to identify and apply combinable operations such as associative, commutative, minimum, and maximum operations. In the example of a graph application, each one of multiple vertices sends an individual network message to a same destination vertex on another processing node (machine node) across the network. Each of the messages may be generated so that the destination will perform a given computation, such as a maximum operation, on values within the received individual network messages. Rather than conveying each of the individual messages to the destination, the operation combiner may generate one or more messages that combine results from the multiple operations. For example, partial results may be precomputed at the operation combiner within the unit 254 on the source processing node. The partial results may then be conveyed to the destination. In this manner, fewer messages are received by the destination and/or fewer operations need to be performed by the destination.

Another example application is performing partial counting of words for MapReduce Mapper operations before delivering combined key/value pairs to the Reducers. MapReduce is a programming model and implementation for processing and generating large data sets with a parallel, distributed algorithm on a cluster. In some embodiments, the individual network messages are stored in respective queues 282 within the system memory 280 before the operation combiner within the unit 254 performs operations on the stored messages. One or more conditions may be satisfied prior to processing the stored network messages, such as a time limit, a queue capacity threshold, a quality-of-service (QoS) parameter, or otherwise. In other embodiments, the network messages are processed by the operation combiner after being generated by the data parallel processor 210 and prior to being stored in a respective queue of the queues 282.

In some embodiments, the operation combiner in unit 254 performs a given type of combinable operation for multiple network messages determined to have combinable operations. The data compressor in unit 254 may compress the amount of data included in network messages. For example, identical data may be identified and replaced with a single instance (or fewer instances) of the data. Consider several threads reading the same address on another processing node (machine node). Rather than sending multiple individual network messages over the network, each redundantly fetching the same value, the data compressor in unit 254 may identify the target read address as being the same in multiple messages. Rather than sending the multiple messages, a single message may be conveyed in order to read the data. Other compression techniques are possible and contemplated.

The message aggregator in unit 254 may create a single large network message from multiple small network messages to conserve network bandwidth. The message aggregator in unit 254 may reduce the overhead of control information in network packets (e.g., in headers and/or trailers). Multiple small network messages with different user data and a same destination are aggregated into a single large network message. The message aggregator in unit 254 creates packet header for the single large network message. The message aggregator in unit 254 may examine multiple queued messages, collect their data into a common buffer, and assemble the collected data into a single larger network message. By having overhead associated with only a single packet, rather than many packets, overall bandwidth consumption may be reduced.

Similar to the operation combiner, the processing performed by the data compressor and the message aggregator may occur upon the generation of network messages from the data parallel processor 210 or after qualifying conditions have been satisfied and network messages may be stored in respective queues 282 within the system memory 280 before processing occurs.

As discussed above, one or more conditions may be required to be satisfied prior to processing stored network messages, such as a time limit, a queue capacity threshold, a quality-of-service (QoS) parameter, or otherwise. In various embodiments, the monitor unit 252 may determine whether one or more conditions are satisfied and further determine which of the operation combiner, the data compressor and the message aggregator to select for processing the stored network messages when the qualifying conditions are met. In some embodiments, each of the operation combiner, the data compressor, and the message aggregator in the unit 254 has respective monitoring logic within the monitor unit 252.

In some embodiments, the monitoring logic 252 may detect or insert flags to identify whether a network message is a combinable message. If the network message is combinable, additional identifiers may be used to specify which operator(s) (e.g., +, x, max, min) is to be applied on the network message when doing combining. In other embodiments, compressor filters are used to determine whether two network messages are identical or meet some specific compression rules. In various embodiments, the functionality of the network send unit 250 and the network receive unit 260 may be combined in a single unit.

Figure 5:
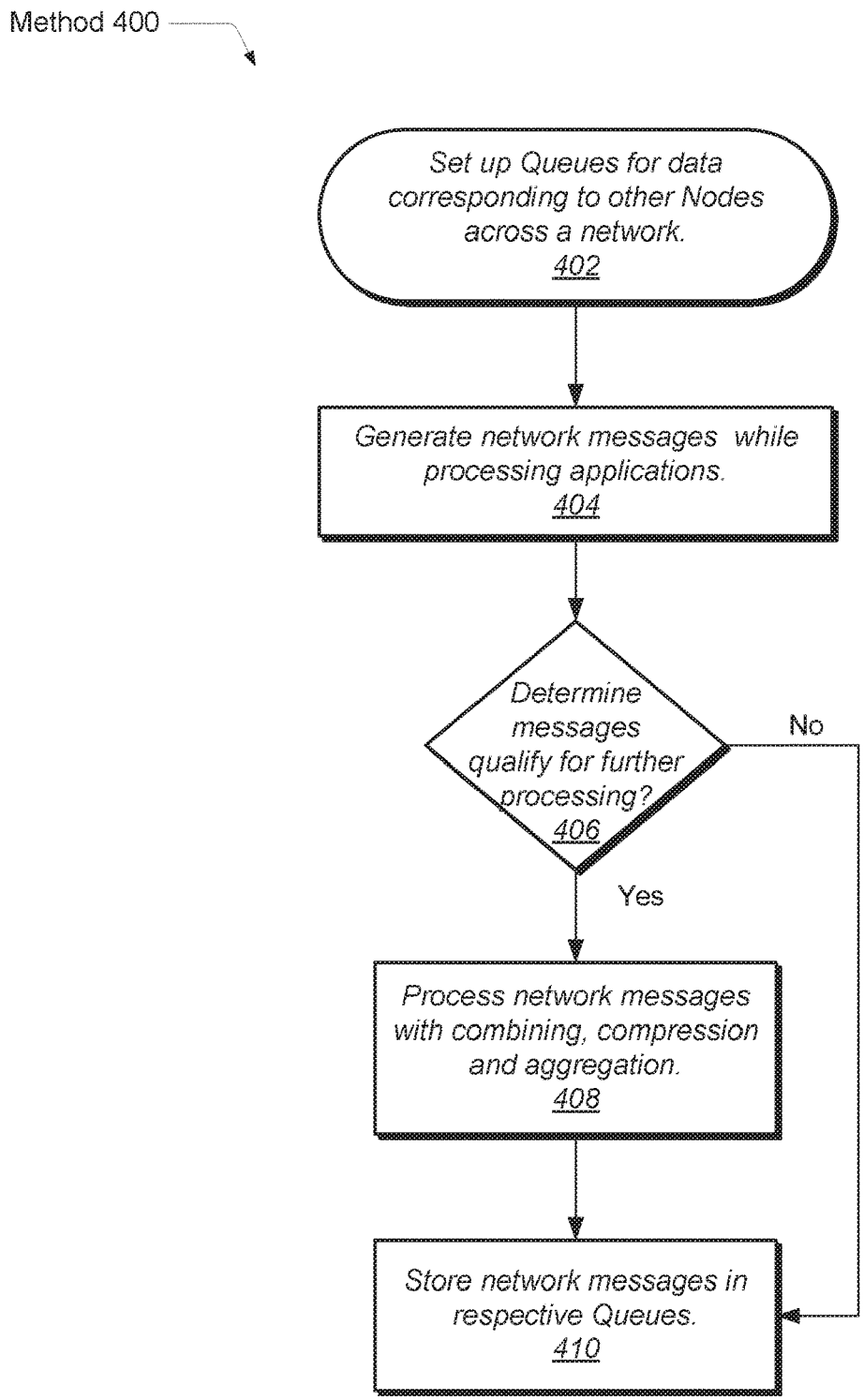
FIG. 5 is a generalized flow diagram of one embodiment of a method for processing generated network messages.

Turning now to FIG. 5, one embodiment of a method 400 for processing generated network messages is shown. The components embodied in the processing node 110 and the data parallel network processing 200 described earlier may generally operate in accordance with method 400. For purposes of discussion, the steps in this embodiment and subsequent embodiments of methods (FIGS. 6-10) described later are shown in sequential order. However, in other embodiments some steps may occur in a different order than shown, some steps may be performed concurrently, some steps may be combined with other steps, and some steps may be absent.

In block 402, respective queues are set up for storing generated network messages. The queues may be assigned to destination processing nodes across a network. Other assignments may be used as well. In block 404, one or more processors execute threads of one or more applications. During thread execution, the one or more processors generate network messages for the threads. The one or more processors may verify whether the generated network messages qualify for further processing. The verifying may include inspecting the generated network messages for an indication (e.g., a flag) that indicates it is suitable for operation combining, data compression, or message aggregation. The verifying may also include comparing particular fields of the generated network messages to given values. The verifying may not yet consider other generated network messages already stored in queues.

If one or more of the generated network messages qualify for further processing (conditional block 406), then in block 408, the generated network messages are further processed. In some embodiments, the processing may include one or more steps of operation combining, data compressing and message aggregating as described earlier. The further processing of the recently generated network messages by the one or more processors may not yet consider other generated network messages already stored in queues. Additional processing of the recently generated network messages that considers other generated network messages already stored in queues may occur afterward by an operation combiner

18*a*, a data compressor 18*b*, and a message aggregator 18*c*. In other embodiments, the processing may include generating an indication (e.g., a flag) that indicates a given network message is suitable for operation combining, data compression, or message aggregation. The indication may be inserted in the network message. The inserted indication may allow for later processing to be more efficient.

After the further processing is performed, in block 410, the resulting network messages are stored in queues. In some embodiments, the network messages are stored in respective queues organized by destination, priority level, or otherwise. If the one or more processors determine the generated network messages do not qualify for further processing (conditional block 406), then the control flow of method 400 moves to block 410. As described earlier, in block 410, the generated network messages are stored in respective queues organized by destination, priority level, or otherwise.

Figure 6:
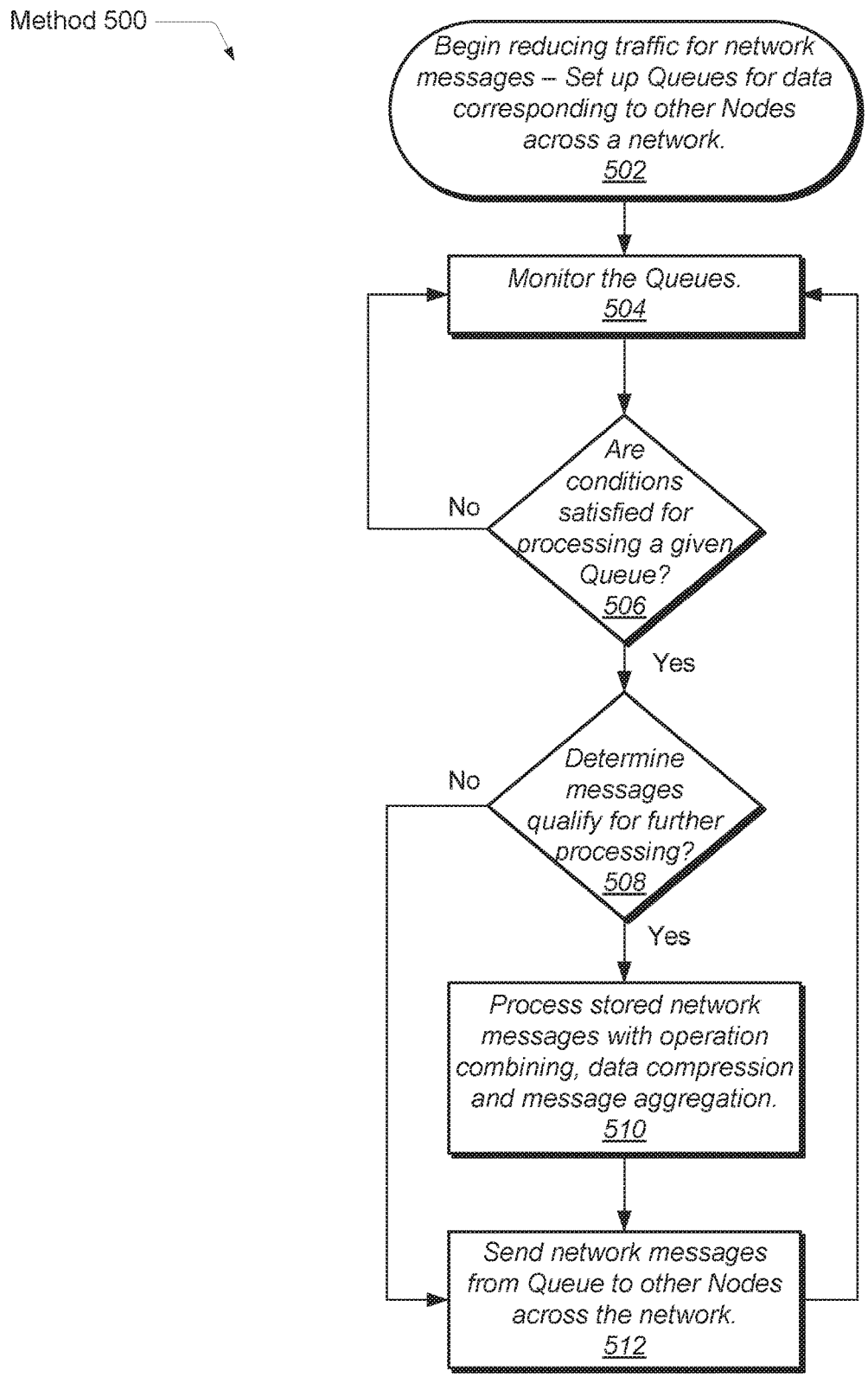
FIG. 6 is a generalized flow diagram of one embodiment of a method for processing and sending generated network messages.

Turning now to FIG. 6, one embodiment of a method 500 for processing and sending generated network messages is shown. The components embodied in the processing node 110 and the data parallel network processing 200 described earlier may generally operate in accordance with method 500. The reduction in cost (overhead) of sending network messages may begin by setting up respective queues for storing generated network messages in block 502. The queues may be assigned to destination processing nodes across a network, though other assignments may be used as well. In block 504, the queues are monitored. Such monitoring may be performed by the data parallel processor, the network interface, the NIC, or otherwise. One or more conditions may be used to determine when to further process detected network messages. As described earlier, a time limit, a storage capacity threshold, or other conditions may be used.

If the conditions are not satisfied for processing a given queue or message (conditional block 506), then control flow of method 500 returns to block 504 and the monitoring of the queues continues. If the conditions are satisfied for processing a given queue (conditional block 506), then a check is performed as to whether one or more of the stored network messages qualify for processing (conditional block 508). In some embodiments, the checking may determine whether an indication (e.g., a flag) exists that indicates a given network message is suitable for operation combining, data compression, or message aggregation. The indication may have been inserted in the network message during earlier generation of the network message. The inserted indication may allow for more efficient processing. The checking may also include comparing particular fields of the generated network messages to given values. The checking may also consider other generated network messages stored in the given queue. In some embodiments, the checking may also consider other generated network messages stored in other queues.

If no stored network messages in the given queue qualify for processing (conditional block 508), then in block 512, the network messages are sent to respective queues in a network interface. When the network interface determines the network messages are ready for sending, the network messages are sent to corresponding nodes across a network. However, if stored network messages in the given queue qualify for processing (conditional block 508), then in block 510, the network messages are processed. The processing may include one or more steps of operation combining, data compressing and message aggregating as described earlier. Method 500 then moves to block 512 and the network messages are sent to respective queues in a network interface. Afterward, the network interface sends the network messages to corresponding nodes across a network. When the stored network messages include at least one processed network message, the at least one processed network message may reduce undesirable overhead attributed to transferring network messages between processing nodes across the network.

Figure 7:
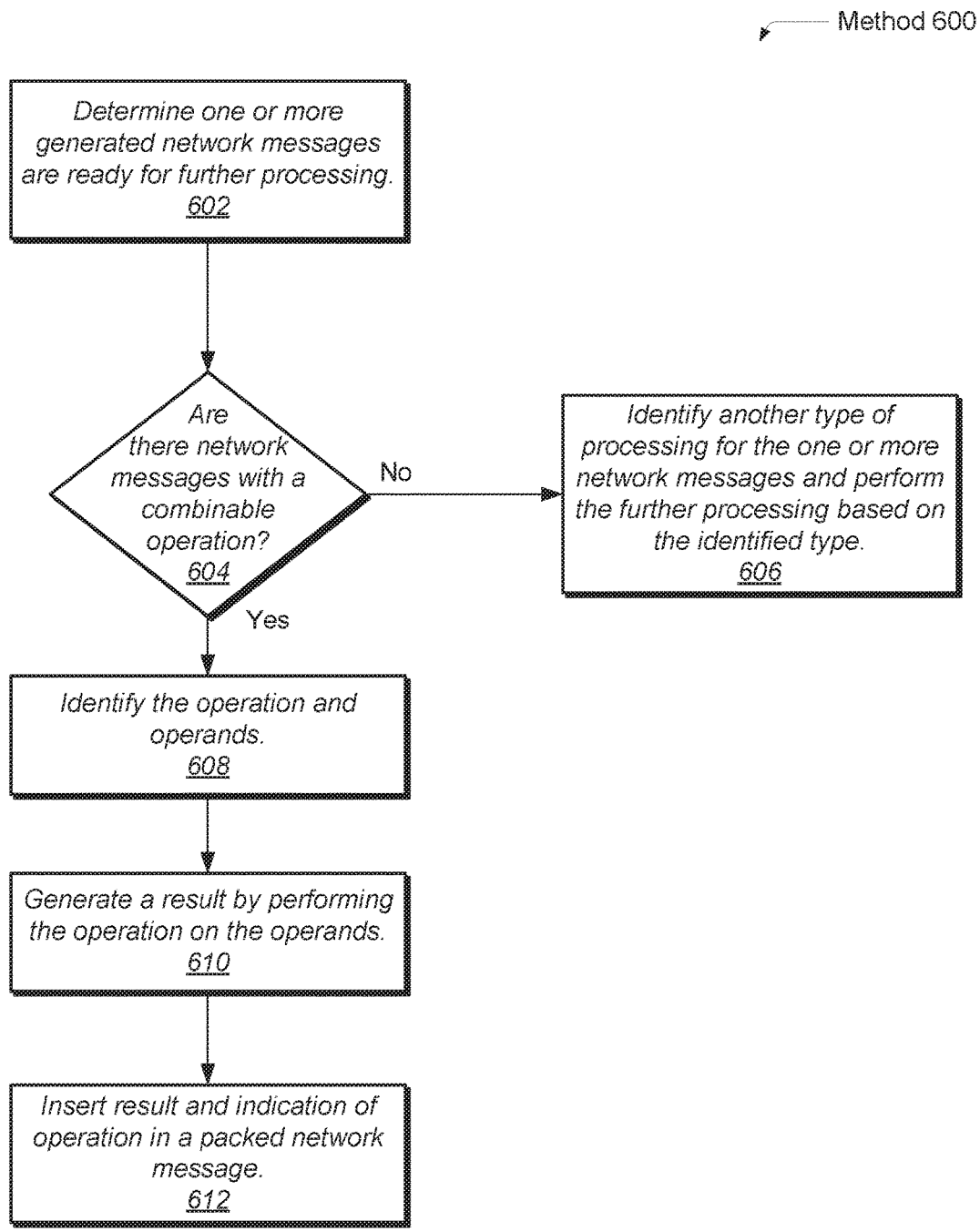
FIG. 7 is a generalized flow diagram of another embodiment of a method for processing generated network messages.

Referring now to FIG. 7, another embodiment of a method 600 for processing network messages is shown. The functionality performed in the blocks 602-612 of FIG. 7 may generally be referred to as operation combining. In block 602, one or more network messages are determined to be ready for further processing. As described earlier, the network messages may be deemed ready upon being generated by a processor. Alternatively, the network messages may be deemed ready upon being stored in particular queues. Otherwise, the network messages may be deemed ready when qualifying conditions are satisfied. One or more of the conditions described earlier for starting processing for the operation combiner 18*a*, the operation combiner 52, the unit 176 and the unit 254 may be used.

As part of, or in addition to, information used to determine whether qualifying conditions are satisfied, a flag or additional identifiers are used to specify whether a given network message is considered to be combinable and which operator (e.g., +, x, max, min) is to be applied on the given network message when doing combining. If there are no network messages which include a combinable operation (conditional block 604), then in block 606, another type of processing for the one or more network messages may be identified. For example, another type of processing may be identified as data compressing or message aggregation for the network messages. The identified type(s) of processing may be performed on the corresponding network messages.

If there are network messages determined to include a combinable operation (conditional block 604), then in block 608, the combinable operation and the operands are identified within the network message. In block 610, a partial result is generated by performing the combinable operation on the operands. For example, the combinable operation may include commutative operations, associative operations, a maximum function, a minimum function and so forth. The result may be considered as a partial result as the operands are intended to be combined at a destination node with other operands in one or more other network messages from one or more other nodes.

In some embodiments, the combinable operation is performed for multiple network messages determined to have an operator indicating the combinable operation followed by repeating performing the combinable operation on the multiple results. In other embodiments, the combinable operation is performed simultaneously on the operands from the multiple network messages.

In block 612, the partial result and an indication of the combinable operation are inserted in a packed network message. These steps may be repeated for each network message with a combinable operation. The packed network message may be grouped with multiple other packed network messages which collectively include a smaller total number and a smaller total size than the number and size of the original generated network messages.

Figure 8:
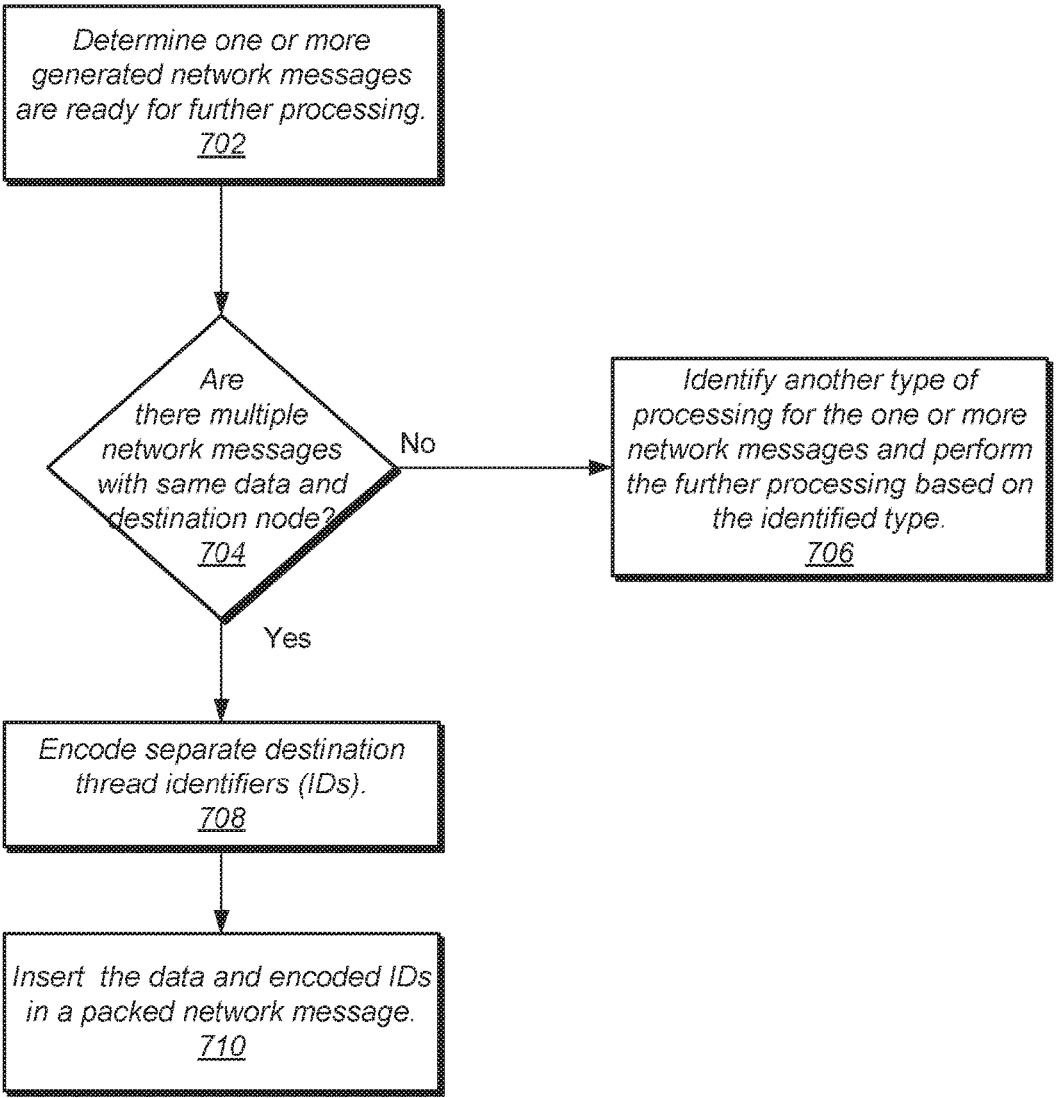
FIG. 8 is a generalized flow diagram of another embodiment of a method for processing generated network messages.

Referring now to FIG. 8, another embodiment of a method 700 for processing network messages is shown. The functionality performed in the blocks 702-712 may generally be referred to as data compressing. As described earlier, the network messages may be deemed ready upon being generated by a processor. Alternatively, the network messages may be deemed ready upon being stored in particular queues. Otherwise, the network messages may be deemed ready when qualifying conditions are satisfied. One or more of the conditions described earlier for starting processing for the data compressor 18b, the data compressor 54, the unit 176 and the unit 254 may be used.

If there are no multiple network messages with same data and a same destination node (conditional block 704), then in block 706, another type of processing for the one or more network messages may be identified. For example, another type of processing may be identified as operation combining or message aggregation for the network messages. The identified type(s) of processing may be performed on the corresponding network messages. Otherwise, if there are multiple network messages with same data and a same destination node (conditional block 704), then in block 706, separate destination thread identifiers (IDs) are encoded in order to distinguish them within a packet header of a packed network message. In block 708, the data and encoded IDs are inserted in a packed network message. These steps may be repeated for each set of network messages with same data and a same destination thread. The packed network message may be grouped with multiple other packed network messages which collectively include a smaller total number and a smaller total size than the number and size of the original generated network messages.

Figure 9:
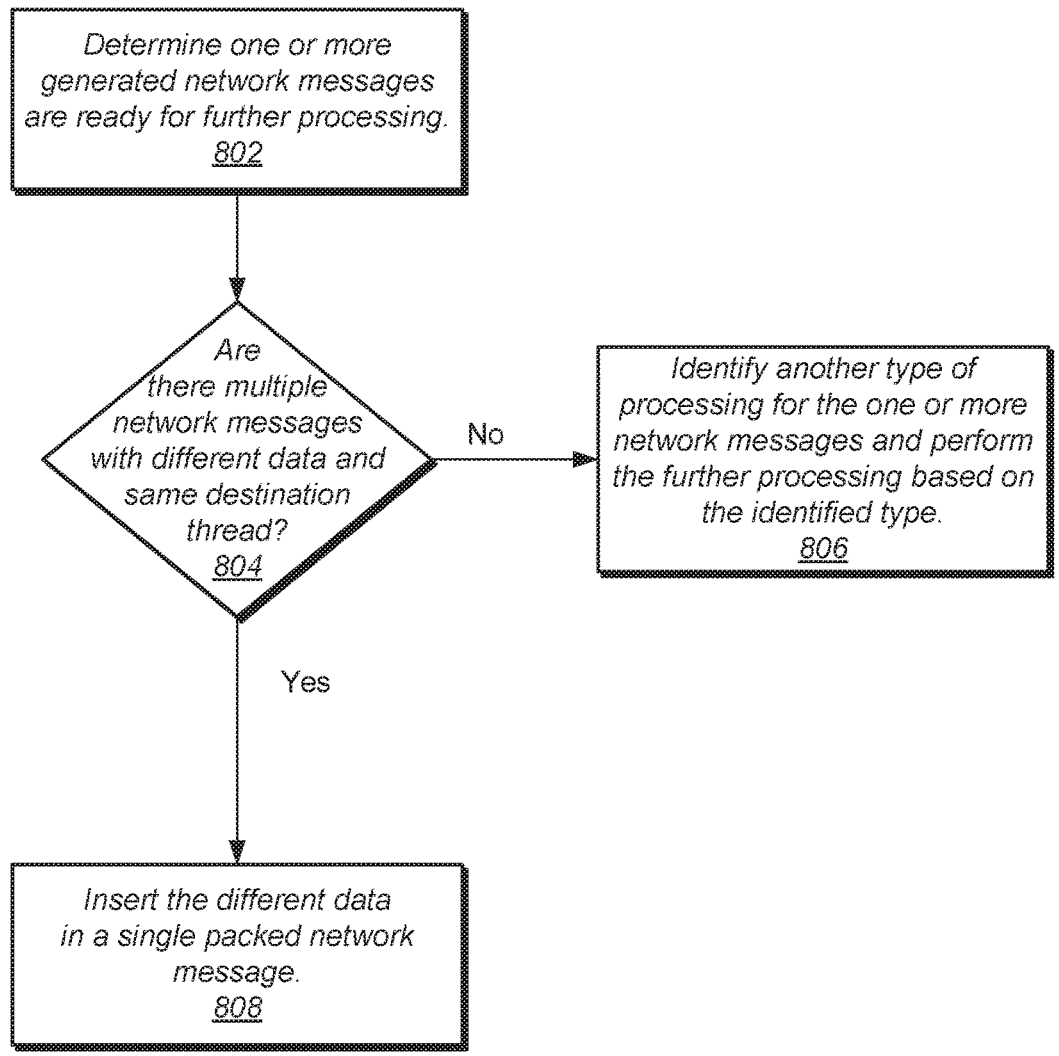
FIG. 9 is a generalized flow diagram of another embodiment of a method for processing generated network messages.

Referring now to FIG. 9, another embodiment of a method 800 for processing network messages is shown. The functionality performed in the blocks 802-808 may generally be referred to as message aggregating. As described earlier, the network messages may be deemed ready upon being generated by a processor. Alternatively, the network messages may be deemed ready upon being stored in particular queues. Otherwise, the network messages may be deemed ready when qualifying conditions are satisfied. One or more of the conditions described earlier for starting processing for the message aggregator 18c, the message aggregator 54, the unit 176 and the unit 254 may be used.

If there are no multiple network messages with different data and a same destination thread (conditional block 804), then in block 806, another type of processing for the one or more network messages may be identified. For example, another type of processing may be identified as operation combining or data compression for the network messages. The identified type(s) of processing may be performed on the corresponding network messages. Otherwise, if there are multiple network messages with different data and a same destination thread (conditional block 804), then in block 808, the different data are inserted in a packed network message. These steps may be repeated for each set of network messages with different data and a same destination thread. The packed network message may be grouped with multiple other packed network messages which collectively include a smaller total number and a smaller total size than the number and size of the original generated network messages.

Figure 10:
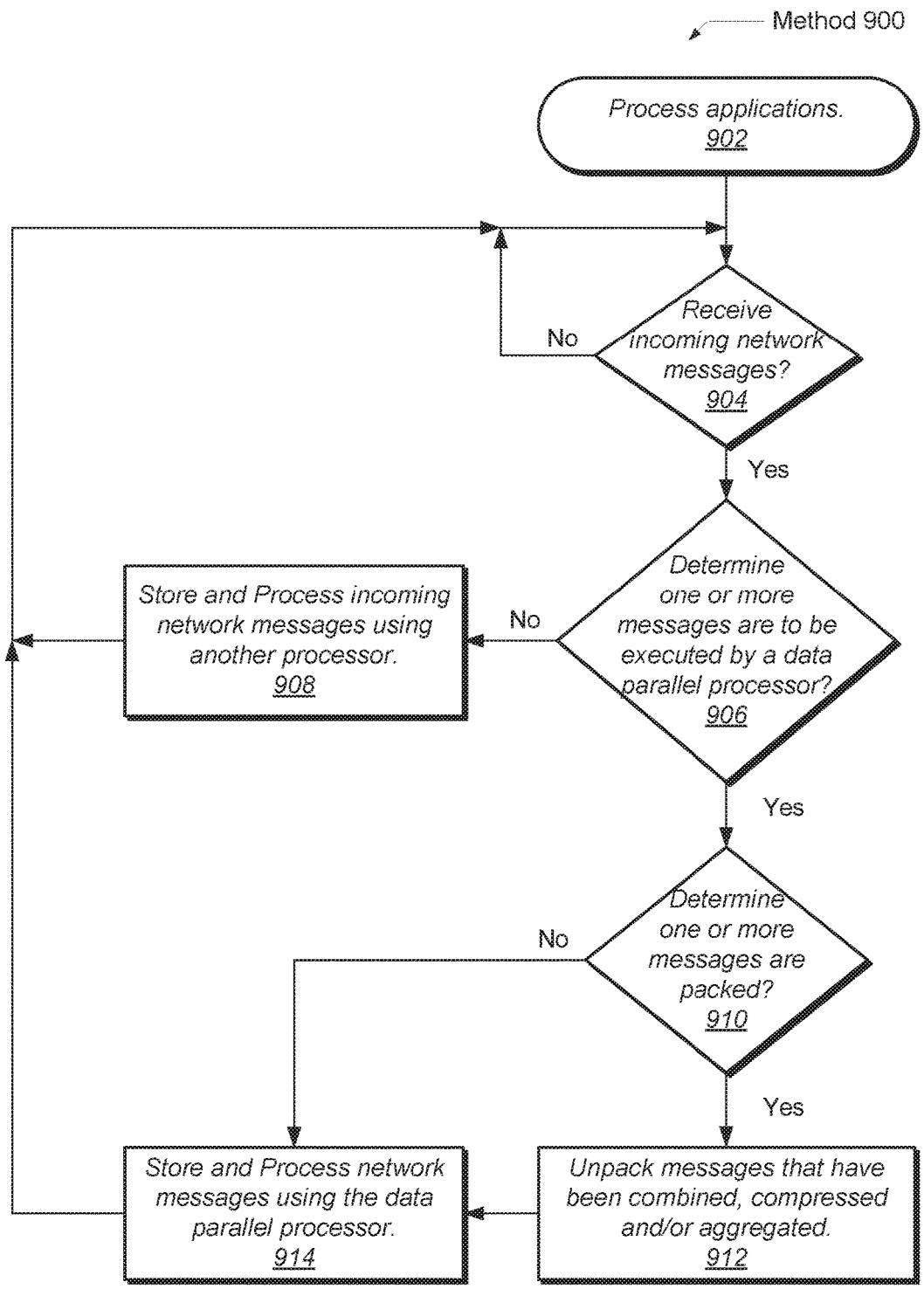
FIG. 10 is a generalized flow diagram of one embodiment of a method for receiving and processing incoming network messages.

Referring now to FIG. 10, one embodiment of a method 900 for receiving and processing incoming network messages is shown. The components embodied in the processing node 110 and the data parallel network processing 200 described above may generally operate in accordance with method 900. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 902, the instructions of applications are processed. In some embodiments, the applications are written in general-purpose graphics processing unit (GPGPU) languages. Threads of execution for the applications may generate network messages to send across a network to other processing nodes (machine nodes). If incoming network messages are received at a given processing node (conditional block 904) and it is determined one or more messages are not intended to be executed by a data parallel processor (conditional block 906), then in block 908, the incoming messages are sent to another processor for processing the messages. For example, a general-purpose CPU or other processor may process the received network messages. In some embodiments, a remote direct memory access (RDMA) enabled network interface card (NIC) receives the network messages. In some embodiments, the circuitry or logic for determining the destination of the incoming network messages and determining the result for the conditional block 906 may reside in the NIC or other interface logic.

If it is determined the one or more received network messages are for the data parallel processor (conditional block 906), then the messages are inspected for possible further processing. In some embodiments, prior to being received from across the network, the network messages are packed, such as the messages were combined, compressed and/or aggregated in another processing node as described earlier. To inspect the content of the received messages, the received message may be unpacked. The unpacking may include performing steps opposite of the operation combining, data compressing and/or message aggregating. The messages may be expanded, replicated and generated into multiple individual messages to process.

If it is determined the received network messages are not packed (conditional block 910), then in block 914, the network messages are processed by the data parallel processor. In some embodiments, the network messages are processed immediately. In other embodiments, the network messages are stored for later processing. If it is determined the received network messages are packed (conditional block 910), then in block 912, the network messages are unpacked. In some embodiments, the NIC includes logic to unpack the packed network messages. In other embodiments, an indication is stored that indicates the data parallel processor or other logic needs to unpack the packed network messages prior to processing. Afterward, in block 914, the network messages are processed by the data parallel processor. Processing by the data parallel processor may include launching a thread for each network message. For example, if an incoming network message is an array of 100 get( ) operations, then the data parallel processor may launch a kernel with 100 threads, each thread capable of processing a respective get( ) operation in a data parallel manner.

To allow for parallel execution of the threads in the data parallel processor, some techniques may be used to detect memory dependences between threads and ensure deadlock does not occur. One technique is to use a derivation of levelization during scheduling of the wavefronts. Another technique is to use a queue to store data for subsequent retrieval by other threads, such as threads executing at other lanes of the data parallel processor. The queue, in this case, provides inter-thread communication of data. For example, the threads of a wavefront may each calculate a portion of an array to be stored at the queue. To ensure that threads do not attempt to store their respective portions at the same queue entry, each thread generates a different pointer value, pointing to a different location of the queue. The different pointer values can be generated by modifying a base pointer by a different offset for each thread. Accordingly, each thread can generate its pointer value by fetching the base pointer and modifying it by a different offset. The threads ensure that the memory location storing the base pointer is not being used by another thread.

In order to generate the pointer values, the threads of the wavefront utilize an operation such as a CFP operation. Further, because the threads of the wavefront are executed in lockstep, each thread arrives at a conditional fetch-and-phi (CFP) operation in the sequence of the thread instructions. This operation checks whether the base pointer is being modified by another thread. If so, the CFP operation returns an indication that the operation has failed. The threads of the wavefront can then take remedial action, including looping on the CFP operation until the operation succeeds. If the check of the base pointer indicates that it is not being modified, the CFP operation modifies the base pointer by a different offset for each thread of the wavefront, thereby generating a pointer to a different location of the queue for each thread.

In another technique to allow for parallel execution of the threads in the data parallel processor, instructions of an application are analyzed and any memory dependences are determined across function calls. Threads may be grouped for execution into work groups, where each work group is partitioned into wavefronts with no memory dependences. A respective queue in memory for a wavefront is created within a task with no memory dependence on other wavefronts.

A size for a respective stack for each wavefront within the task with memory dependence on other wavefronts is determined. A count of get( ) calls and put( ) calls may be used to determine the size. Locations may be selected in memory for the stacks to be drained sequentially according to the memory dependences between wavefronts. The wavefronts are scheduled sequentially based on the memory dependences and the stacks are drained accordingly.

In addition to the two above techniques, other techniques for allowing parallel execution of the threads in the data parallel processor may be used. When the parallel execution of the threads occur on the data parallel processor, as network messages are both received and generated, the processing of the messages may occur as described earlier without involvement with a general-purpose processor, such as a CPU.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing node comprising:
a processor configured to generate a plurality of network messages; and
a network operation combiner, wherein in response to an indication that one or more network messages of the plurality of network messages are combinable, the network operation combiner is configured to:
perform a combining operation on a plurality of data elements in the one or more network messages to produce a given result; and
generate a first packed network message comprising the given result in place of the plurality of data elements, wherein the first packed network message includes fewer than all of the data elements in the one or more network messages;
a data compressor configured to replace two or more network messages with a second packed network message responsive to the two or more network messages comprising an indication of a same destination node and one or more data elements in common, the second packed network message comprising an indication of the destination node and a single copy of the one or more data elements in common.

2. The processing node as recited in claim 1, wherein the combining operation comprises any one or more of: a commutative operation, an associative operation, a maximum function, or a minimum function.

3. The processing node as recited in claim 1, wherein the processing node further comprises a message aggregator configured to replace two or more network messages with a third packed network message responsive to the two or more network messages comprising an indication of a same destination node and one or more different data elements, the second packed network message comprising an indication of the destination node and a copy of the one or more different data elements.

4. The processing node as recited in claim 3, wherein the message aggregator is further configured to insert in a given packed network message an indication of a number of network messages to expand from the given packed network message.

5. The processing node as recited in claim 1, wherein the processing node further comprises a unit that includes at least the network operation combiner, wherein the unit is configured to:
monitor a total size of the plurality of network messages generated by the processor; and
responsive to determining the total size of the plurality of network messages exceeds a threshold, send an indication to the network operation combiner to process the plurality of network messages.

6. The processing node as recited in claim 1, wherein:
the processing node further comprises a network interface configured to receive and send network messages across a network;
the operation combiner is further configured to send an indication to the network interface to send packed network message across the network instead of one or more of the plurality of network messages.

7. The processing node as recited in claim 6, wherein in response to receiving a given packed network message, the network interface is further configured to generate two or more network messages, each with data from the received packed network message.

8. A method comprising:
generating a plurality of network messages;
wherein in response to an indication that one or more network messages of the plurality of network messages is combinable:
performing a combining operation on a plurality of data elements in the one or more network messages to produce a given result; and
generating a first packed network message comprising the given result in place of the plurality of data elements, wherein the first packed network message includes fewer than all of the data elements in the one or more network messages;
replacing two or more network messages with a second packed network message responsive to the two or more network messages comprising an indication of a same destination node and one or more data elements in common, the second packed network message comprising an indication of the destination node and a single copy of the one or more data elements in common.

9. The method as recited in claim 8, wherein the combining operation comprises any one or more of: a commutative operation, an associative operation, a maximum function, or a minimum function.

10. The method as recited in claim 8, further comprising replacing two or more network messages with a third packed network message responsive to the two or more network messages comprising an indication of a same destination node and one or more different data elements, the second packed network message comprising an indication of the destination node and a copy of the one or more different data elements.

11. The method as recited in claim 10, further comprising inserting in a given packed network message an indication of a number of network messages to expand from the given packed network message.

12. The method as recited in claim 10, further comprising sending an indication to a network interface indicating to send packed network message across a network and bypass sending one or more of the plurality of network messages used to generate the packed network messages.

13. The method as recited in claim 8, further comprising:
monitoring a total size of the plurality of network messages generated by the processor; and
responsive to determining the total size of the plurality of network messages exceeds a threshold, sending an indication to a network operation combiner to process the plurality of network messages.

14. The method as recited in claim 13, further comprising inserting in a given packed network message an indication of a number of network messages to expand from the given packed network message and an indication of which data to place in which of the number of network messages.

15. A computing system comprising:
a source node;
a network; and
a target node coupled to the source node via the network; and
wherein the source node is configured to:
generate a plurality of network messages;
in response to an indication that one or more network messages of the plurality of network messages is combinable:
perform a combining operation on a plurality of data elements in the one or more network messages to produce a given result; and
generate a first packed network message comprising the given result in place of the plurality of data elements, wherein the first packed network message includes fewer than all of the data elements in the one or more network messages;
replace two or more network messages with a second packed network message responsive to the two or more network messages comprising an indication of a same destination node and one or more data elements in common, the second packed network message comprising an indication of the destination node and a single copy of the one or more data elements in common.

16. The computing system as recited in claim 15, wherein the source node is further configured to send the first packed network message across the network to the target node and bypass sending one or more of the plurality of network message.

17. The computing system as recited in claim 15, wherein the source node is further configured to replace two or more network messages with a third packed network message responsive to the two or more network messages comprising an indication of a same destination node and one or more different data elements, the second packed network message comprising an indication of the destination node and a copy of the one or more different data elements.

* * * * *